(12) United States Patent
Curtis (10) Patent No.: US 7,724,981 B2
(45) Date of Patent: May 25, 2010

(54) ADAPTIVE CONTRAST CONTROL SYSTEMS AND METHODS

(75) Inventor: Donald B. Curtis, Highland, UT (US)

(73) Assignee: Ancestry.com Operations Inc., Provo, UT (US)

( * ) Notice: Subject to any disclaimer, the term of this patent is extended or adjusted under 35 U.S.C. 154(b) by 1096 days.

(21) Appl. No.: 11/188,137

(22) Filed: Jul. 21, 2005

(65) Prior Publication Data

US 2007/0019881 A1    Jan. 25, 2007

(51) Int. Cl.
  G06K 9/40   (2006.01)
  G06K 9/00   (2006.01)
  G06K 9/34   (2006.01)
  G06K 9/62   (2006.01)
  H04N 1/40   (2006.01)
  G03F 3/08   (2006.01)

(52) U.S. Cl. .................. 382/274; 382/169; 382/173; 382/225; 358/461; 358/522

(58) Field of Classification Search ................ 382/225, 382/169, 274, 173; 358/461, 522
See application file for complete search history.

(56) References Cited

U.S. PATENT DOCUMENTS

| | | | | |
|---|---|---|---|---|
| 5,307,425 A | * | 4/1994 | Otsuka | 382/252 |
| 5,608,548 A | * | 3/1997 | Sobol | 358/522 |
| 5,745,660 A | * | 4/1998 | Kolpatzik et al. | 358/3.19 |
| 5,901,243 A | * | 5/1999 | Beretta | 382/168 |
| 6,072,912 A | * | 6/2000 | Orito | 382/274 |
| 6,125,199 A | * | 9/2000 | Sato et al. | 382/162 |
| 6,144,775 A | * | 11/2000 | Williams et al. | 382/252 |
| 6,198,845 B1 | * | 3/2001 | Tse et al. | 382/169 |
| 6,249,357 B1 | * | 6/2001 | Metcalfe et al. | 358/451 |
| 6,571,013 B1 | | 5/2003 | Macey et al. | |
| 6,594,401 B1 | * | 7/2003 | Metcalfe et al. | 382/275 |
| 6,618,171 B1 | * | 9/2003 | Tse et al. | 358/446 |
| 6,748,119 B1 | * | 6/2004 | Bollman | 382/254 |
| 7,075,552 B2 | * | 7/2006 | Herbert et al. | 345/589 |
| 7,098,944 B1 | * | 8/2006 | Shiraiwa et al. | 348/222.1 |
| 7,236,632 B2 | | 6/2007 | Erol et al. | |
| 7,349,574 B1 | * | 3/2008 | Sodini et al. | 382/168 |
| 2002/0067851 A1 | | 6/2002 | Lange et al. | |
| 2002/0093592 A1 | | 7/2002 | Naka et al. | |

(Continued)

*Primary Examiner*—Aaron W Carter
*Assistant Examiner*—Kathleen S Yuan
(74) *Attorney, Agent, or Firm*—Townsend and Townsend and Crew LLP (57) ABSTRACT

A method of operating on an image of a document includes, for an electronic file that includes a representation of the document, portioning the representation of the document into non-overlapping areas. Each area includes a matrix of pixels and each pixel has an initial grayscale value and a position in the matrix. The method also includes, for each area, determining a black point value and a white point value. The method further includes, for each pixel in each area, determining a revised pixel grayscale value for the pixel using the pixel's grayscale value, the pixel's position in the matrix, the black point value for the area comprising the pixel, the white point value for the area comprising the pixel, the black point value for at least one area adjacent to the area comprising the pixel, and/or the white point value for at least one area adjacent to the area comprising the pixel. The method also includes producing the image of the document using the revised grayscale values for each pixel.

20 Claims, 4 Drawing Sheets

U.S. PATENT DOCUMENTS

| | | |
|---|---|---|
| 2002/0093670 A1* | 7/2002 | Luo et al. .................... 358/1.9 |
| 2003/0113016 A1 | 6/2003 | Naoi et al. |
| 2003/0161007 A1* | 8/2003 | Maurer et al. .............. 358/3.26 |
| 2004/0057632 A1* | 3/2004 | Gindele ...................... 382/274 |
| 2004/0066979 A1* | 4/2004 | Gindele et al. .............. 382/274 |
| 2004/0105595 A1* | 6/2004 | Watanabe et al. ........... 382/274 |
| 2004/0218811 A1* | 11/2004 | Edge et al. .................. 382/162 |
| 2005/0249402 A1* | 11/2005 | Tin ............................. 382/162 |
| 2007/0047816 A1 | 3/2007 | Graham et al. |
| 2007/0110330 A1* | 5/2007 | Chauville et al. ........... 382/274 |

* cited by examiner

ADAPTIVE CONTRAST CONTROL SYSTEMS AND METHODS

Embodiments of the present invention relate generally to electronic document enhancement. More specifically, embodiments of the present invention relate to systems and methods for improving the quality of electronic documents through adaptive contrast control.

BACKGROUND OF THE INVENTION

With the introduction of the Internet, digital content services are becoming increasingly popular. Companies digitize documents, books, official records, and so on, and make them available to subscribing customers. Thus, scanning and digitizing documents has become an important industry.

Several problems exist with digital documents. For example, digitized documents are sometimes difficult to read. Reasons for this include poor source documents (e.g., the documents may be too dark, too light (faded), or be old and yellowed, fragile or degenerating) and poor scanning equipment or processes. Persons with less than ideal eye sight often struggle to read digitized documents, and eye strain, even in people with excellent vision, may reduce the effectiveness of reading digitized documents. Many digitized documents are also difficult to read/interpret by automated processes such as OCR. Further, digitized documents are often large in size and require substantial resources to store and significant time to download.

Others have attempted to solve these problems in several ways. For example, some have used "thresholding" to improve the quality of digitized images. Thresholding is used to convert a gray-scale or color document to a black and white (bitonal) image. The resulting image has very high contrast and is highly compressible. Choosing an appropriate threshold that results in a readable document, however, is an exceptionally difficult problem. Many techniques have been suggested. Some of these techniques are adaptive, that is, they analyze each area of the document independently to determine appropriate thresholds for each area. None of these techniques are reliable enough, however, (especially with hand-written documents) to provide significant confidence that the original document data will not be lost or significantly degraded. Also, adaptive techniques are often computationally expensive, prohibiting their use in real-time or semi-real time situations.

Others have attempted to use "leveling," which involves choosing the black point and white point (and sometimes the mid-tone) of an image and then interpolating the values of the image based on those values. Auto-leveling analyzes the image to determine the black point and white point of the image automatically, typically based on the histogram of the image (noting where a significant number of values start and end in the histogram). The problem with both leveling and auto-leveling is that different parts of the image may be darker or lighter than other parts, and global image leveling may improve parts of the image without improving others. Also, because the leveling is done based on the entire range of the image, the leveling may be reduced in its effect and not result in as much contrast in the resultant image as is desired.

Still others have used brightness and/or contrast adjustments. Adjusting the brightness or contrast of a document, whether manually or automatically, has similar disadvantages to the leveling process in that this process is typically done globally across an entire image, not giving the results required for any given sub-location of the image.

For at least the foregoing reasons, improved systems and methods are needed for improving digitized images.

BRIEF SUMMARY OF THE INVENTION

Embodiments of the invention provide a method of operating on an image of a document. The method includes, for an electronic file that includes a representation of the document, portioning the representation of the document into non-overlapping areas. Each area includes a matrix of pixels and each pixel has an initial grayscale value and a position in the matrix. The method also includes, for each area, determining a black point value and a white point value. The method further includes, for each pixel in each area, determining a revised pixel grayscale value for the pixel using the pixel's grayscale value, the pixel's position in the matrix, the black point value for the area comprising the pixel, the white point value for the area comprising the pixel, the black point value for at least one area adjacent to the area comprising the pixel, and/or the white point value for at least one area adjacent to the area comprising the pixel. The method also includes producing the image of the document using the revised grayscale values for each pixel.

In some embodiments, the black point and white point values are determined for each area before a revised pixel value is determined for any given pixel. Producing the image of the document may include printing an image of the document with a facsimile machine, printing an image of the document with a printer, printing an image of the document with a facsimile machine, and/or rendering the image on a display. The method may include receiving an electronic file that includes. Receiving a representation of the document may include creating the electronic file using a scanner, extracting the electronic file from computer-readable memory, receiving the electronic file at a facsimile machine, creating the electronic file using a copy machine, and/or creating the electronic file using a facsimile machine.

In some embodiments, determining a black point value and a white point value for each area may include determining a threshold value, determining a background mean and a background standard deviation using pixel grayscale values of pixels having an initial grayscale value on one side of the threshold value, determining a foreground mean and a foreground standard deviation using pixel grayscale values of pixels having an initial grayscale value on an opposite side of the threshold value, receiving a background constant and a foreground constant, calculating the white point value (WP) using the formula $WP = backMean + (backStdDev * backConstant)$, wherein backMean is the background mean, backStdDev is the background standard deviation, and backconstant is the background constant, and calculating the black point value (BP) using the formula $BP = foreMean + (foreStdDev * foreConstant)$, wherein foreMean is the foreground mean, foreStdDev is the foreground standard deviation, and foreconstant is the background constant.

In still other embodiments, determining a threshold value may include selecting a value that is equidistant from a mean of pixel grayscale values below the threshold value and a mean of pixel grayscale values above the threshold value. Receiving a background constant and a foreground constant may include receiving a user input for at least one of the background constant and the foreground constant. Determining a revised pixel grayscale value for each pixel may include calculating a weighted black point (WBP) for the pixel, calculating a weighted white point (WWP) for the pixel, calculating a scale factor (SF) for the pixel using the formula SF=(GS/(WWP−WBP)), wherein GS is the number of possible values for the pixel's grayscale value, and calculating the revised pixel grayscale value using the formula RPV=(PV−WBP)×SF, wherein PV is the pixel's initial grayscale value. The grayscale value may be a color grayscale value for a primary color in which case the method may include repeating the process for at least a second primary color.

In still other embodiments, a system for operating on an image of a document includes a processor and computer-executable instructions that program the processor to receive an electronic file that includes a representation of the document, portion the representation of the document into non-overlapping areas. Each area includes a matrix of pixels, each pixel having an initial grayscale value and a position in the matrix. The instructions also program the processor to, for each area, determine a black point value and a white point value, for each pixel in each area, determine a revised pixel grayscale value for the pixel using the pixel's grayscale value, the pixel's position in the matrix, the black point value for the area comprising the pixel, the white point value for the area comprising the pixel, the black point value for at least one area adjacent to the area comprising the pixel, and/or the white point value for at least one area adjacent to the area comprising the pixel. The instructions also program the processor to produce the image of the document using the revised pixel grayscale value for each pixel.

In still other embodiments, a computer-readable medium has stored thereon computer-executable instructions for programming a processor to operate on an image of a document. The instructions program the processor to, receive an electronic file that includes a representation of the document, portion the representation of the document into non-overlapping areas. Each area includes a matrix of pixels, each pixel having an initial grayscale value and a position in the matrix. The instructions also program the processor to, for each area, determine a black point value and a white point value, for each pixel in each area, determine a revised pixel grayscale value for the pixel using the pixel's grayscale value, the pixel's position in the matrix, the black point value for the area comprising the pixel, the white point value for the area comprising the pixel, the black point value for at least one area adjacent to the area comprising the pixel, and/or the white point value for at least one area adjacent to the area comprising the pixel. The instructions also program the processor to produce the image of the document using the revised pixel grayscale value for each pixel.

In still other embodiments, a method of operating on an image of a document includes, for an electronic file that includes a representation of the document, portioning the representation of the document into non-overlapping areas. Each area includes a matrix of pixels. Each pixel has an initial grayscale value and a position in the matrix. The method includes, for each area, determining a black point value and a white point value, for each area, determining a confidence value, for each area, determining a revised black point value and a revise white point value by applying the confidence value to the black point value and the white point value, for each pixel in each area, determining a revised pixel grayscale value for the pixel using the revised white point value and the revised black point value; and producing the image of the document using the revised pixel grayscale value for each pixel.

In some embodiment, determining a revised pixel grayscale value for each pixel in each area includes determining a revised pixel grayscale value for each pixel in each area using the pixel's initial grayscale value, the pixel's position in the matrix, the revised black point value for at least one area adjacent to the area comprising the pixel, and/or the revised white point value for at least one area adjacent to the area comprising the pixel. Determining a confidence value for each area may include determining a confidence value in relation to a difference magnitude between the black point value and the white point value. Determining a confidence value for each area may include determining a confidence value based on a histogram of pixel grayscale values in the area. Determining a confidence value for each area may include determining a confidence value based on a directional correlation among black point values and white point values in adjacent areas.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

According to embodiments of the invention, an electronic image of a document may be enhanced by removing artifacts, improving its contrast, sharpening handwritten portions, and/or the like. This is accomplished efficiently by dividing the document into convolutions (a.k.a. "areas") and "leveling" each convolution. Hence, while some embodiments of the invention may be applied to pixel-by-pixel leveling techniques, the teachings herein do not require a pixel-by-pixel analysis. This is because the leveling on each convolution may be performed "adaptively." That is, a quality final result may be achieved by relating each convolution and/or using information from one convolution to "normalize" or otherwise verify another convolution. Hence, embodiments of the present invention provide efficient enhancements to digital document images without requiring a pixel-by-pixel analysis.

Embodiments of the present invention produce high-contrast documents, in real-time, that are reliably readable, easily down-samplable (even to a bitonal document), and highly compressible without significant loss. Embodiments of the invention may be employed to enhance the readability of on-line documents, increase the compressibility of digital documents, and/or improve images for applications such as imaging (e.g., scanning and OCR), facsimile, copying, and printing. Those skilled in the art will appreciate many other applications in light of the disclosure herein.

Figure 1:
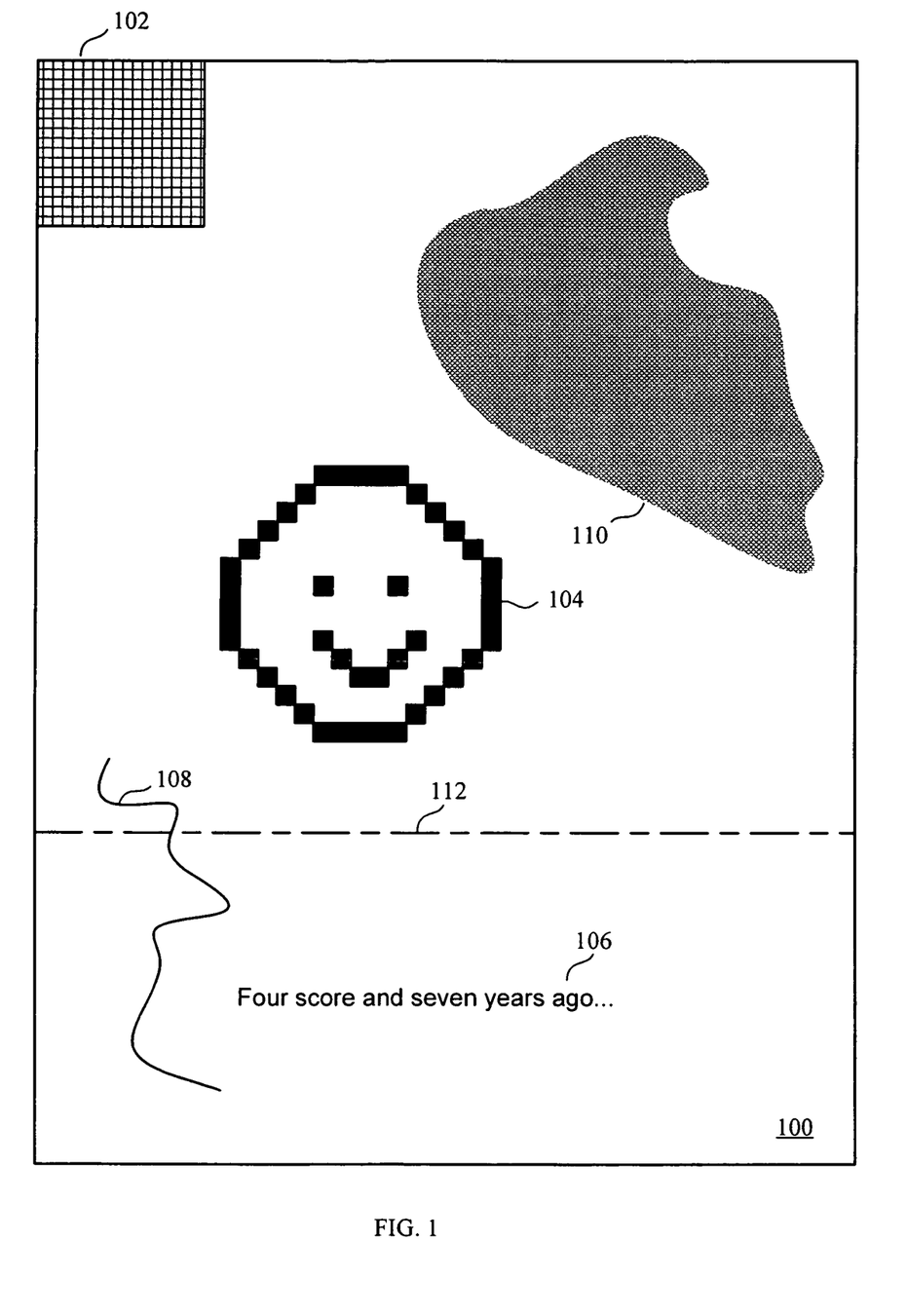
FIG. 1 illustrates a document image to which embodiment of the invention may be applied.

Attention is directed to FIG. 1, which illustrates an exemplary document image 100 to which embodiments of the invention may be applied. For display, the document image 100 is pixilated as shown by the region 102. For ease of illustration, the remainder of the document is not necessarily shown to be pixilated, although those skilled in the art will appreciate that the image portions of the document are produced by varying the state of the pixels, usually between 0 and 255 for grayscale images. Color documents typically are produced by "layering" primary color images, in which each pixel has three grayscale values, one for each primary color.

The document image 100 includes information contained in graphics 104 and/or text 106. Additionally, however, the document image 100 may include undesired artifacts, such as random marks 108, dark regions 110, visible creases 112, and/or the like. The artifacts may originate from aged or mishandled original documents, for example. When such a document is converted to an electronic image representation (e.g., facsimile, scan, or print), the artifacts end up in the electronic document. In some instances, the undesired artifacts obscure the information areas. The following method 200 may be applied to the document 100 to better distinguish the information regions from the undesired artifacts.

Figure 2:
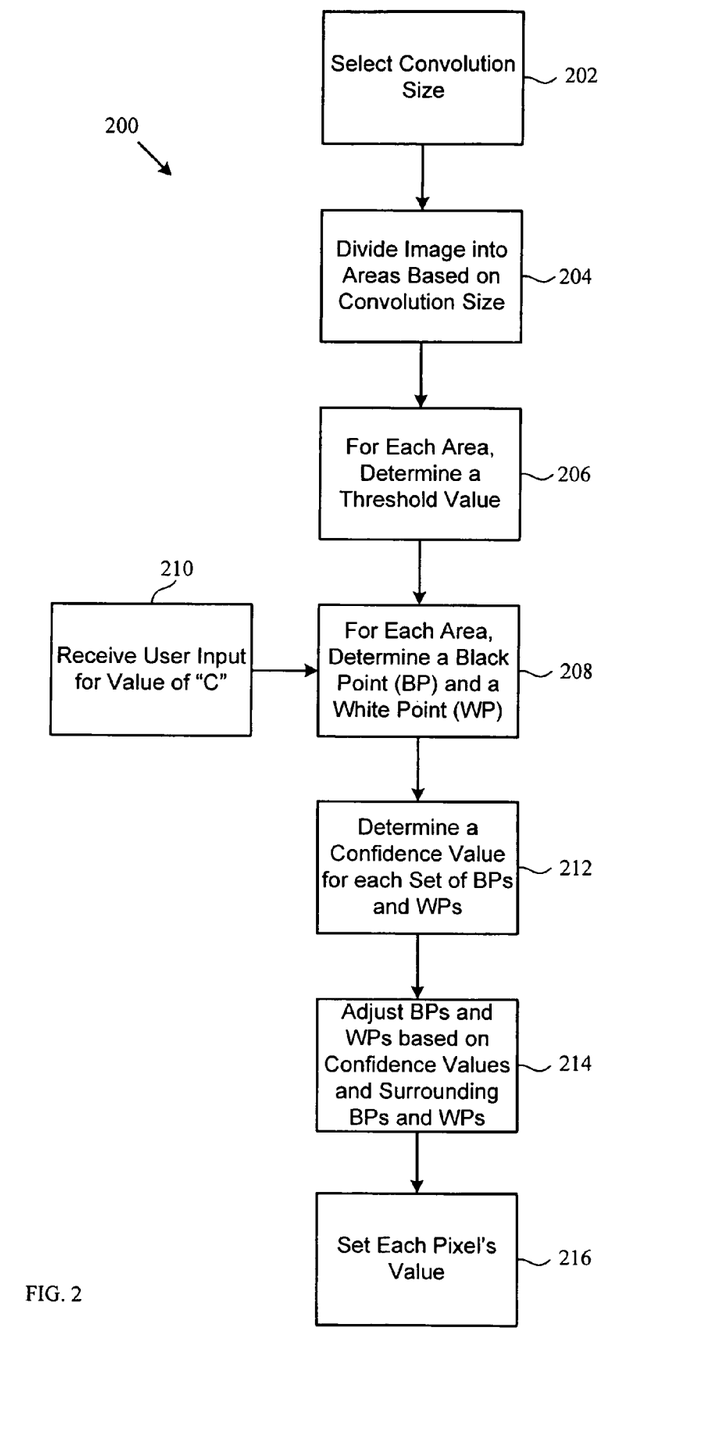
FIG. 2 illustrates a method of enhancing an electronic document according to embodiments of the invention.

Attention is directed to FIG. 2, which illustrates the method 200 according to embodiments of the invention. For ease of illustration, the method 200 relates to displaying a digitized image for a viewer, although similar embodiments may be applied to any of the previously-mentioned applications. Those skilled in the art will appreciate that the method 200 is merely exemplary of a number of possible embodiments; other methods according to other embodiments may have more, fewer, or different steps than those illustrated and described herein. Moreover, the operations illustrated and described herein may be traversed in different orders in other embodiments.

The method 200 begins at block 202 at which point a convolution size is selected. The convolution size determines the number of areas into which the document image 100 will be divided. It also effects the number of calculations that will be performed in the ensuing steps. The convolution size should be sufficiently large that both foreground and background portions of the document will be included in each area, although this is not essential. The convolution size should not be so big, however, that the document is insufficiently sampled. The convolution size generally results in a square matrix of pixels having an odd length and width such as 3×3, 5×5, 53×53, etc. In other embodiments, however, the convolution size may result in non-square and/or non-odd-sided matrices.

At block 204, the image is divided into areas based on the convolution size. In some embodiments, the areas overlap slightly; in other embodiments, the areas are non-overlapping.

Figure 3:
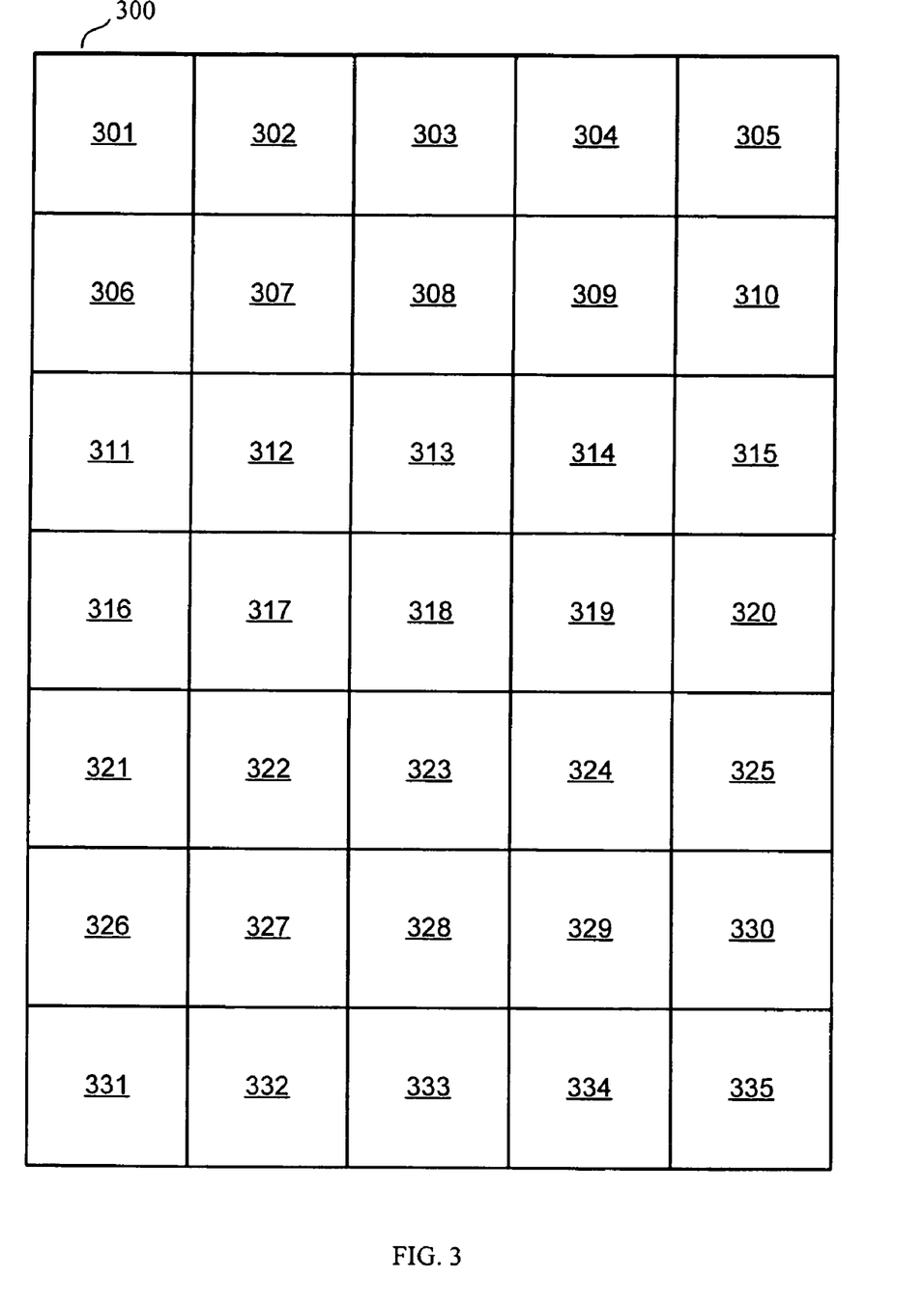
FIG. 3 illustrates an electronic document divided into areas based on the convolution size selected according to embodiments of the invention.

FIG. 3 illustrates a document 300 divided into non-overlapping areas based on the convolution size. The areas 301-335 are of equal size and perfectly divide the document, although this is not necessary. The convolution size may result in odd size areas. In such cases, the odd areas may be concentrated on either side, top, or bottom of the document, or distributed throughout the document.

At block 206, a threshold value is determined for each area. The threshold value distinguishes foreground from background. The threshold value may be determined in any of a variety of ways. In a specific embodiment, a histogram-based technique is used that iteratively searches for a value that is equidistant from the mean of the pixel grayscale values above and below the threshold value in the area. The advantage of this technique is that it handles well the case where there are both foreground and background normal distributions of values, even if those distributions overlap.

At block 208, a black point value (BP) and a white point (WP) value are determined for each area. The mean and standard deviation of the pixel grayscale values above and below the threshold are used to calculate the WP and the BP respectively. The calculation may be supplemented using a constant whereby:

$$WP = backMean + (backStdDev * backconstant); \text{ and}$$

$$BP = foreMean - (foreStdDev * foreConstant),$$

wherein backMean is the mean of the background pixel values, backStdDev is the standard deviation of the background pixel values, and backConstant is the constant for the background pixels. Similarly, foreMean is the mean of the foreground pixel values, foreStdDev is the standard deviation of the foreground pixel values, and foreConstant is the constant for the foreground pixels. The constant may be hard-coded or user-defined. If user defined, the input from the user is received as shown at block 210. For example, the user may slide a control icon that adjusts the constant. The constant allows the user to determine the intensity of the background and/or the foreground. A different constant may be used for each of the background and foreground.

In some embodiments, a mid-tone (MT) value is selected. The MT value may be equidistant between the BP and WP or may be a user-selectable distance from either. In still other embodiments, additional values are selected in addition to the BP, WP, and MT values.

At block 212, a confidence value is determined for each set of BPs and WPs. The confidence value is a measure of whether the BP and WP for an area accurately reflect the information content of the area. If the BP and WP are too close together, the area may have significant distortion, extensive undesired artifacts, simply be all background or all foreground, and/or the like. Such situations may produce undesired results in the final image. For example, the areas may be too light or too dark, which will cause the area to stand out from the rest of the image, producing undesirable artifacts. The confidence value may be used to correct and/or minimize the effects of this situation.

In some embodiments, the confidence value is calculated based on the magnitude of the difference between the BP and WP for an area, with 100% confidence being applied if the difference is over a first threshold and 0% if the difference is below a second threshold. Between the two thresholds, the confidence may range from 0 to 100%. The thresholds may be determined based on the particular grayscale or color resolution being used (e.g., 8-bit grayscale verses 4-bi grayscale). Many other possibilities exist and are apparent to those skilled in the art in light of this disclosure.

As another example, the confidence value may be determined by analyzing the shape and/or magnitude of the histogram for an area to determine if both foreground and background values are represented. Further, statistical analysis techniques may be employed to determine if one or two sets of values (normal distributions) are represented by the surrounding data points.

Other embodiments also or alternatively determine the weight to give to a set of black and white points by observing the directional correlation from area to area. If there is a high degree of horizontal, vertical, or diagonal correlation (i.e. very similar values in that direction), then more weight would be given to those BPs and WPs. Another technique is to look for discontinuities. If the black and white points are significantly different than those of surrounding rectangles, then the confidence in those values is less (although that confidence can be increased by the other factors described above).

At block 214, the BPs and WPs (and MTs or other points, if used) are adjusted based on the confidence value. In some cases, this simply entails multiplying the confidence by the BP or WP, although this is not necessarily a universal solution. In some cases the BP and WP for an area are disregarded (e.g., 0% confidence) in which case the revised BP and/or WP may be an average of the BPs and WPs from surrounding areas. Other techniques may take into account the location of the area with respect to the image. For example, if the area is a far side, the area may be assumed to have no information, in which case the area has no BP. In other embodiments, a "globally-calculated" BP or WP may be used. Many such possibilities exist and are apparent to those skilled in the art in light of this disclosure.

At block 216, a final value for each pixel in the image is determined. Recognizing that using convolution techniques at each point of an image is computationally-expensive, especially if the convolution size is very large, interpolation is used in some embodiments to determine a pixel's final value. Hence, for each pixel, the WPs and BPs from surrounding areas are weighted based on the distance between the subject pixel and the center point of the area. Generally, this optimization does not degrade the quality noticeably from a pixel-by-pixel convolution-based approach while dramatically increasing performance.

In a specific embodiment, final pixel values are calculated as follows. While many different methods could be used to determine the order of operating on pixels (e.g., left-to-right, top-to-bottom; randomly, etc,), a specific embodiment operates area by area. Then for each area, pixels are operated on by sub-areas. This is illustrated in FIG. 4.

Figure 4:
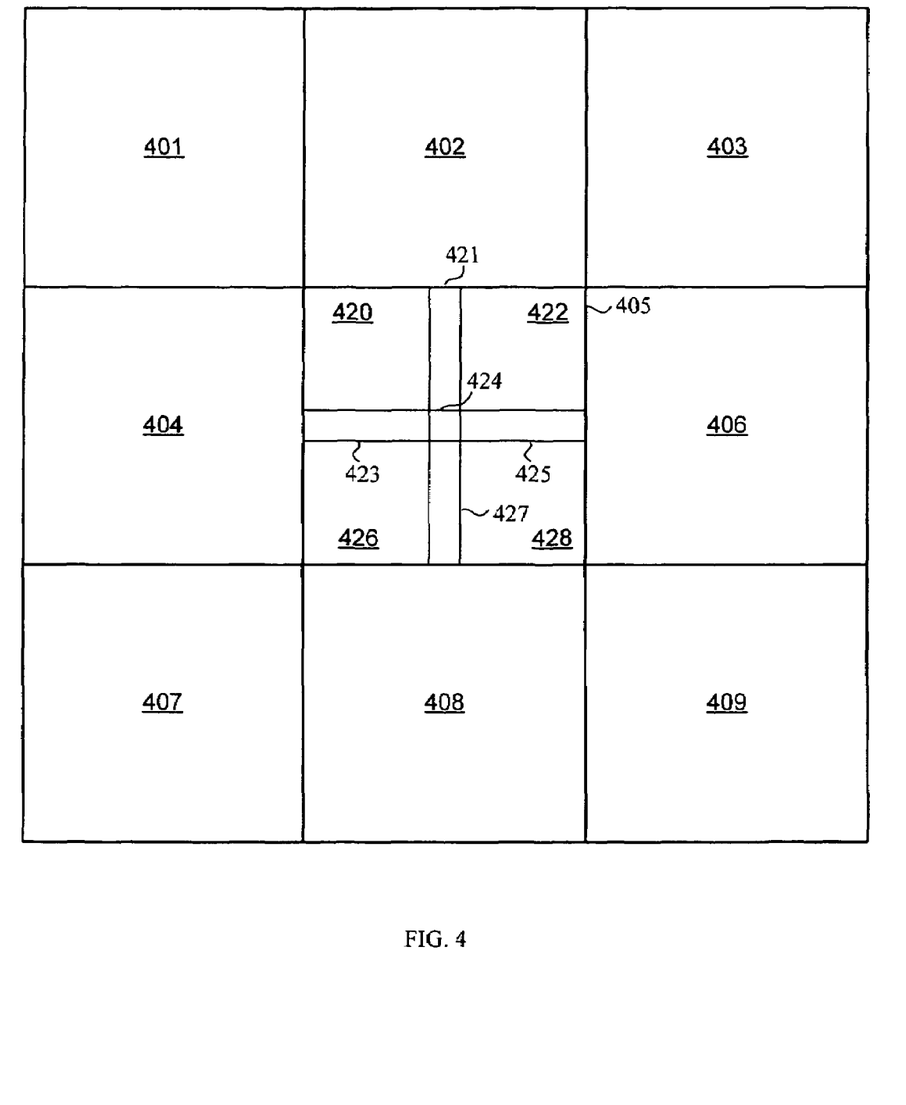
FIG. 4 illustrates a group of nine areas of a given convolution size according to an embodiment of the invention.

FIG. 4 illustrates a 3×3 region of the document image of FIG. 3. For example, the 3×3 region for FIG. 4 could be the upper left region of FIG. 3 that includes areas 301, 302, 303, 306, 307, 308, 311, 312, and 313. Area 405 is the center area of the 3×3, in which final pixel values are being determined. A similar approach is used for all the areas in the document image.

The area 405 is divided into nine sub-areas, 420, 421, 422, 423, 424, 425, 426, 427, and 428. The sub-areas need not be the same size, as is the case here. For example, the area 421 is only one pixel wide, while the area 424 is only a single pixel.

For each pixel in each sub-area, a weighted BP (WBP) and a weighted WP (WWP) are calculated. Each sub-area is influenced by a different combination of surrounding areas. For example, the area 420 is influenced by areas 401, 402, 404, and 405, while the area 425 is influenced only by areas 405 and 406. The WBP and WWP are calculated for each pixel using the BP and WP of each surrounding area and the distance from the pixel to the center point of the area. Once the WBP and WWP are determined for a given pixel, the revised pixel value (RPV) is calculated using the formula RPV=(PV−WBP)×SF, where RPV is the pixel's final value, PV is the pixel's initial value, and SF is a scale factor. This value is "clamped" to a value between 0 and 255 (for eight-bit grayscale). The scale factor (SF) is calculated as SF=(255/(WWP−WBP)). It should be apparent that this is but one exemplary approach to interpolating a pixel's final value. Thereafter, the revised image may be displayed, printed, stored, and/or the like.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A computer-readable medium having stored thereon computer-executable instructions for programming a processor to operate on an image of a document, wherein the instructions program the processor to:

for an electronic file comprising a representation of the document, portion the representation of the document into non-overlapping areas, each area comprising a matrix of pixels, each pixel having an initial grayscale value and a position in the matrix;

for each area, determine a black point value and a white point value;

for each pixel in each area, determine a revised pixel grayscale value for each pixel using one or more selections from the group consisting of:

each pixel's grayscale value;

each pixel's position in the matrix;

the black point value for each area comprising each pixel;

the white point value for each area comprising each pixel;

the black point value for at least one area adjacent to each area comprising each pixel; and the white point value for at least one area adjacent to each area comprising each pixel, wherein the determining of the revised pixel grayscale value for each pixel further comprises:

calculating a weighted black point (WBP) for each pixel;

calculating a weighted white point (WWP) for each pixel;

calculating a scale factor (SF) for each pixel using the formula SF=(GS/(WWP−WBP)), wherein GS is the number of possible values for each pixel's grayscale value; and calculating the revised pixel grayscale value using the formula RPV=(PV−WBP)×SF, wherein PV is the pixel's initial grayscale value; and produce the image of the document using the revised grayscale values for each pixel.

2. The computer-readable medium of claim 1, wherein the black point and white point values are determined for each area before a revised pixel value is determined for any given pixel.

3. The computer-readable medium of claim 1, wherein in programming the processor to produce the image of the document the instructions program the process to perform a selection from a group consisting of:

printing an image of the document with a facsimile machine;

printing an image of the document with a printer;

printing an image of the document with a facsimile machine; and rendering the image on a display.

4. The computer-readable medium of claim 1, further comprising receiving the electronic file comprising the representation of the document wherein the receiving of the electronic file comprising a representation of the document comprises a selection from a group consisting of:

creating the electronic file using a scanner;

extracting the electronic file from computer-readable memory;

receiving the electronic file at a facsimile machine;

creating the electronic file using a copy machine; and creating the electronic file using a facsimile machine.

5. The method of computer-readable medium 1, wherein determining of the black point value and the white point value for each area comprises:
    determining a threshold value;
    determining a background mean and a background standard deviation using pixel grayscale values of pixels having an initial grayscale value on one side of the threshold value;
    determining a foreground mean and a foreground standard deviation using pixel grayscale values of pixels having an initial grayscale value on an opposite side of the threshold value;
    receiving a background constant and a foreground constant;
    calculating the white point value (WP) using the formula WP=backMean+(backStdDev*backConstant), wherein backMean is the background mean, backStdDev is the background standard deviation, and backconstant is the background constant; and
    calculating the black point value (BP) using the formula BP=foreMean+(foreStdDev*foreConstant), wherein foreMean is the foreground mean, foreStdDev is the foreground standard deviation, and foreconstant is the background constant.

6. The computer-readable medium of claim 5, wherein determining of the threshold value comprises selecting a value that is equidistant from a mean of pixel grayscale values below the threshold value and a mean of pixel grayscale values above the threshold value.

7. The computer-readable medium of claim 5, wherein receiving of the background constant and the foreground constant comprises receiving a user input for at least one of the background constant and the foreground constant.

8. A system for operating on an image of a document, the system comprising:
    a processor; and
    computer-executable instructions that program the processor to:
        receive an electronic file comprising a representation of the document;
        portion the representation of the document into non-overlapping areas, wherein each area comprises a matrix of pixels, each pixel having an initial grayscale value and a position in the matrix;
        for each area, determine a black point value and a white point value, wherein in programming the processor to determine a black point value and a white point value for each area, the instructions further program the processor to:
        determine a threshold value;
        determine a background mean and a background standard deviation using pixel grayscale values of pixels having an initial grayscale value on one side of the threshold value;
        determine a foreground mean and a foreground standard deviation using pixel grayscale values of pixels having an initial grayscale value on an opposite side of the threshold value;
        receive a background constant and a foreground constant;
        calculate the white point value (WP) using the formula WP=backMean+(backStdDev*backConstant), wherein backMean is the background mean, backStdDev is the background standard deviation, and backconstant is the background constant; and
        calculate the black point value (BP) using the formula BP=foreMean+(foreStdDev*foreConstant), wherein foreMean is the foreground mean, foreStdDev is the foreground standard deviation, and foreconstant is the background constant;
        for each pixel in each area, determine a revised pixel grayscale value for each pixel using one or more selections from the group consisting of:
        each pixel's grayscale value;
        each pixel's position in the matrix;
        the black point value for the area comprising each pixel;
        the white point value for the area comprising each pixel;
        the black point value for at least one area adjacent to the area comprising each pixel; and
        the white point value for at least one area adjacent to each area comprising each pixel; and
        produce the image of the document using the revised pixel grayscale value for each pixel.

9. The system of claim 8, wherein in programming the processor to produce the image of the document the instructions program the process to perform a selection from a group consisting of:
    print an image of the document with a facsimile machine;
    print an image of the document with a printer;
    print an image of the document with a facsimile machine; and
    render the image on a display.

10. The system of claim 8, wherein in programming the processor to receive the electronic file comprising the representation of the document, the instructions program the processor to perform a selection from a group consisting of:
    create the electronic file using a scanner;
    extract the electronic file from computer-readable memory;
    receive the electronic file at a facsimile machine;
    create the electronic file using a copy machine; and
    create the electronic file using a facsimile machine.

11. The system of claim 8, wherein in programming the processor to determine the threshold value the instructions program the processor to select a value that is equidistant from a mean of pixel grayscale values below the threshold value and a mean of pixel grayscale values above the threshold value.

12. The system of claim 8, wherein in programming the processor to receive the background constant and the foreground constant the instructions program the processor to receive a user input for at least one of the background constant and the foreground constant.

13. The system of claim 8, wherein in programming the processor to, for each pixel in each area, determine the revised pixel grayscale value for the pixel, the instructions program the processor to:
    calculate a weighted black point (WBP) for each pixel;
    calculate a weighted white point (WWP) for each pixel;
    calculate a scale factor (SF) for each pixel using the formula SF=(GS/(WWP−WBP)), wherein GS is the number of possible values for each pixel's grayscale value; and
    calculate the revised pixel grayscale value using the formula RPV=(PV−WBP)×SF, wherein PV is each pixel's initial grayscale value.

14. A computer-readable medium having stored thereon computer-executable instructions for programming a processor to operate on an image of a document, wherein the instructions program the processor to:
    receive an electronic file comprising a representation of the document;

portion the representation of the document into non-overlapping areas, wherein each area comprises a matrix of pixels, each pixel having an initial grayscale value and a position in the matrix;

for each area, determine a black point value and a white point value, wherein in programming the processor to determine a black point value and a white point value for each area, the instructions further program the processor to:

determine a threshold value, wherein in programming the processor to determine the threshold value the instructions further program the processor to select a value that is equidistant from a mean of pixel grayscale values below the threshold value and a mean of pixel grayscale values above the threshold value;

determine a background mean and a background standard deviation using pixel grayscale values of pixels having an initial grayscale value on one side of the threshold value;

determine a foreground mean and a foreground standard deviation using pixel grayscale values of pixels having an initial grayscale value on an opposite side of the threshold value;

receive a background constant and a foreground constant;

calculate the white point value (WP) using the formula WP=backMean+(backStdDev*backConstant), wherein backMean is the background mean, backStdDev is the background standard deviation, and backconstant is the background constant; and calculate the black point value (BP) using the formula BP=foreMean+(foreStdDev*foreConstant), wherein foreMean is the foreground mean, foreStdDev is the foreground standard deviation, and foreconstant is the background constant;

for each pixel in each area, determine a revised pixel grayscale value for each pixel using one or more selections from the group consisting of:
each pixel's grayscale value;
each pixel's position in the matrix;
the black point value for each area comprising each pixel;
the white point value for each area comprising each pixel;
the black point value for at least one area adjacent to each area comprising each pixel; and
the white point value for at least one area adjacent to the area comprising each pixel; and produce the image of the document using the revised pixel grayscale value for each pixel.

15. The computer-readable medium of claim 14, wherein in programming the processor to receive the background constant and the foreground constant the instructions program the processor to receive a user input for at least one of the background constant and the foreground constant.

16. The computer-readable medium of claim 14, wherein in programming the processor to, for each pixel in each area, determine the revised pixel grayscale value for each pixel, the instructions program the processor to:
calculate a weighted black point (WBP) for each pixel;
calculate a weighted white point (WWP) for each pixel;
calculate a scale factor (SF) for each pixel using the formula SF=(GS/(WWP−WBP)), wherein GS is the number of possible values for each pixel's grayscale value; and
calculate the revised pixel grayscale value using the formula RPV=(PV−WBP)×SF, wherein PV is each pixel's initial grayscale value.

17. A computer-readable medium having stored thereon computer-executable instructions for programming a processor to operate on an image of a document, wherein the instructions program the processor to:

for an electronic file comprising a representation of the document, portioning the representation of the document into non-overlapping areas, each area comprising a matrix of pixels, each pixel having an initial grayscale value and a position in the matrix;

for each area, determining a black point value and a white point value;

for each area, determining a confidence value, wherein determining of the confidence value for each area comprises determining the confidence value in relation to a difference magnitude between the black point value and the white point value;

for each area, determining a revised black point value and a revise white point value by applying the confidence value to the black point value and the white point value;

for each pixel in each area, determining a revised pixel grayscale value for each pixel using the revised white point value and the revised black point value; and producing the image of the document using the revised pixel grayscale value for each pixel.

18. The computer-readable medium of claim 17, wherein determining the revised pixel grayscale value for each pixel in each area further comprises determining the revised pixel grayscale value for each pixel in each area using one or more selections from the group consisting of:
each pixel's initial grayscale value;
each pixel's position in the matrix;
the revised black point value for at least one area adjacent to each area comprising each pixel; and
the revised white point value for at least one area adjacent to each area comprising each pixel.

19. The computer-readable medium of claim 17, wherein determining of the confidence value for each area comprises determining the confidence value based on a histogram of pixel grayscale values in the area.

20. The computer-readable medium of claim 17, wherein determining of the confidence value for each area comprises determining the confidence value based on a directional correlation among black point values and white point values in adjacent areas.

* * * * *